Figure 1:
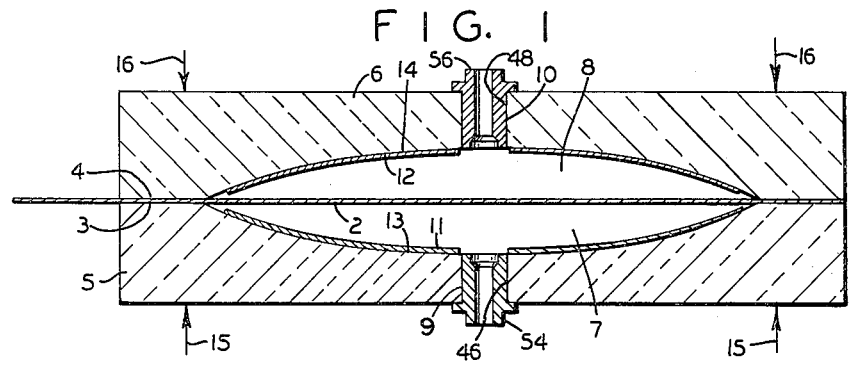

Sept. 12, 1961  R. WOLFE  2,999,386
HIGH PRECISION DIAPHRAGM TYPE INSTRUMENTS
Filed Nov. 2, 1956  2 Sheets-Sheet 1

INVENTOR.
Russell Wolfe
BY
BLAIR & SPENCER
ATTORNEYS

Sept. 12, 1961 R. WOLFE 2,999,386
HIGH PRECISION DIAPHRAGM TYPE INSTRUMENTS
Filed Nov. 2, 1956 2 Sheets-Sheet 2

INVENTOR.
Russell Wolfe
BY
BLAIR & SPENCER
ATTORNEYS

United States Patent Office 2,999,386
Patented Sept. 12, 1961

2,999,386
HIGH PRECISION DIAPHRAGM TYPE INSTRUMENTS
Russell Wolfe, Lexington, Mass., assignor to Trans-Sonics, Inc., Lexington, Mass.
Filed Nov. 2, 1956, Ser. No. 620,051
15 Claims. (Cl. 73—398)

My invention relates to instruments which utilize the movement of a diaphragm with respect to a fixed supporting structure as their sensitive portion. More particularly, it relates to an improved construction for pressure transducers in which diaphragm motion is utilized to measure pressure differentials.

Several different instruments utilize a thin diaphragm positioned by a fixed supporting structure and held under radial tension as their sensitive portion. Diaphragms may be caused to move by the difference in fluid pressure applied to each side thereof, in which case the diaphragm is usually made of fluid impervious material or, if the diaphragm is of electrically conducting material, it may be deflected by electrostatic forces. If the diaphragm is made of magnetic material, it may be deflected by a magnetic field. Diaphragm motion may also be produced as a result of acceleration, the instrument in this case serving as an accelerometer. The movement of the diaphragm as the result of the application of force to it may be measured by any one of several different means. For example, if diaphragm deflection is caused by a pressure differential across it, this motion, and thus the pressure differential, may be measured by determining the amount of electrostatic force required to return it to its undeflected position. A more common means of utilizing the electrostatic properties of the diaphragm is to measure the change in capacitance between the diaphragm and a fixed electrode mounted on the supporting structure or a pair of electrodes supported on opposite sides of the diaphragm. The change in capacitance may be measured by using a bridge circuit or placing the capacitor in a tuned circuit and observing the frequency variation. My invention is particularly directed to instruments of the type having an electrode to measure the diaphragm displacement. Instruments of this type have been used as differential pressure sensing devices, as analogue multipliers, and in many other applications.

One of the major problems in such devices is to obtain an instrument of high precision, i.e., one whose output indications are repeatable, stable, and have high resolution. To achieve high precision, the instrument should have high zero stability of the diaphragm, i.e., its output indications should remain constant over a long period of time when no deflecting forces are applied, and its hysteresis must be low. Hysteresis may be defined as a variation in the position of the diaphragm for the same applied force depending upon whether this force was achieved by increasing from a lesser force or decreasing from a greater one.

Instruments of this type should also have a high natural frequency to be capable of following rapid changes in applied force, and they should have a high resolution, giving discernible changes in output for very small changes in applied force. Overload conditions, especially in pressure sensing instruments, should not damage the instrument, even if maintained over long periods of time. Instruments utilizing stretched diaphragms have heretofore had zero stabilities of the order of between 1 and 1/10 of 1% and have measurable hysteresis. They have also been designed in general for laboratory use, not being considered sufficiently rugged for use in severe industrial or military applications.

Instruments of this general character have heretofore been made utilizing extremely thin diaphragms under substantial radial tension. The tension in the diaphragm makes possible instruments which utilize true membrane deflection of such thin tensioned diaphragms to obtain wide range, very small hysteresis, and excellent linearity. A true membrane returns exactly to the plane of its support because a membrane material is itself limp in the sense of not being able to resist the returning forces when under radial tension. Even though such instruments utilize steel diaphragms if the diaphragm is thin, it is limp in the absence of radial tension, and when high radial tension is applied, the diaphragm exerts a large restoring force and thus acts as a membrane. Thus, a one-half mil stainless steel diaphragm of two inch diameter having no tension therein will deflect to a distance of about seven mils under an applied differential pressure of approximately one mm. of Hg. However, when the same diaphragm is under a radial tension close to the maximum useful tension which can be applied, i.e., about 80,000 lbs. per square inch, the center will deflect about seven mils for an applied differential pressure of about two p.s.i., which is approximately 100 mm. of Hg. This increase by a ratio of 100 to 1 in range when the diaphragm is under high radial tension indicates that the diaphragm stiffness can be substantially increased by such radial tension. Therefore, the diaphragm deflects as a pure membrane, and, consequently, the zero hysteresis characteristic of a pure membrane can be nearly achieved.

To utilize the advantages of the thin radially tensioned diaphragm, it is necessary to clamp it about its periphery with substantial force to maintain the tension. The usual method of accomplishing this has been to clamp the edges of the diaphragm between two metallic rings or similar structure.

However, if an electrode supporting structure or any other member is brought to bear on the clamped diaphragm, as the diaphragm deflects, frictional sliding, with attendant hysteresis will be introduced.

If the electrode supporting structure or other member is not made to bear against the diaphragm, then the spacing between the diaphragm and the electrode will not be stable with an attendant zero shift. Thus, in prior instruments, a choice had to be made between the inaccuracies resulting from hysteresis if the electrode support contacted on the diaphragm and zero shift if it were spaced from the diaphragm.

Another problem present in these prior devices related to the grounding of the electrically conducting diaphragms used in some instruments by the diaphragm supporting structures. Rather than insulate the metal supporting structure, the diaphragm structure and thus, the diaphragms were usually grounded. The electrodes were physically located on one or both sides of the diaphragm and with the metal diaphragm, formed a capacitor or a pair of capacitors. One circuit connection to measure the diaphragm motion consists of connecting these capacitors to the secondary of a transformer supplying excitation voltage. Two substantially identical resistors were also connected across the transformer secondary in series, the resistors and the capacitors forming a bridge circuit. The output signal from the pressure sensitive device then appeared between grounded diaphragm and the junction of the series resistors.

This method of operating the instrument, however, placed the various stray capacitances from the electrodes to the grounded case and from the leads, etc., to ground, in parallel with each capacitor. The stray capacitance may be of the same order of magnitude as each instrument capacitor. Thus, variations in the stray capacitance due to shifts of the pressure sensitive portion of the instrument in its grounded case, variations in lead position, etc., caused inaccuracies and changes in the output signal.

Accordingly, the principal object of my invention is to provide improved instruments which utilize in their operation the motion of a diaphragm, stretched under substantial radial tension, with respect to a non-moving structure. A more particular object of my invention is to provide an instrument of the above character having improved precision in its operation. A further object of my invention is to provide an instrument of the type described having a minimum zero shift and nearly zero hysteresis. Another object of my invention is to provide an instrument of the type described having an insulated conducting diaphragm to minimize errors resulting from stray capacitance. A further object of my invention is to provide an instrument in which the electrode and diaphragm supporting structure is formed from a single insulated homogeneous body which clamps and insulates the diaphragm. Still another object of my invention is to provide an instrument which will not be damaged by overload conditions, even if sustained for long periods. A still further object of my invention is to provide an improved instrument of the above character for use in sensing differential pressure. Yet another object of my invention is to provide an instrument of the above character which is simple and economical in construction and rugged in operation. Other and further objects of my invention will in part be obvious and will in part appear hereinafter.

The invention accordingly comprises the features of construction, combinations of elements, and arrangement of parts which will be exemplified in the construction hereinafter set forth, and the scope of the invention will be indicated in the claims.

Figure 2:
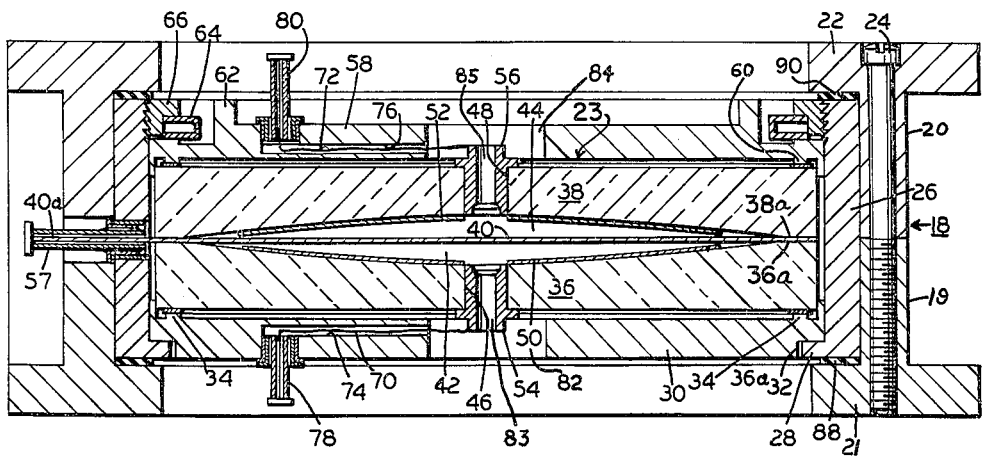
Figure 3:
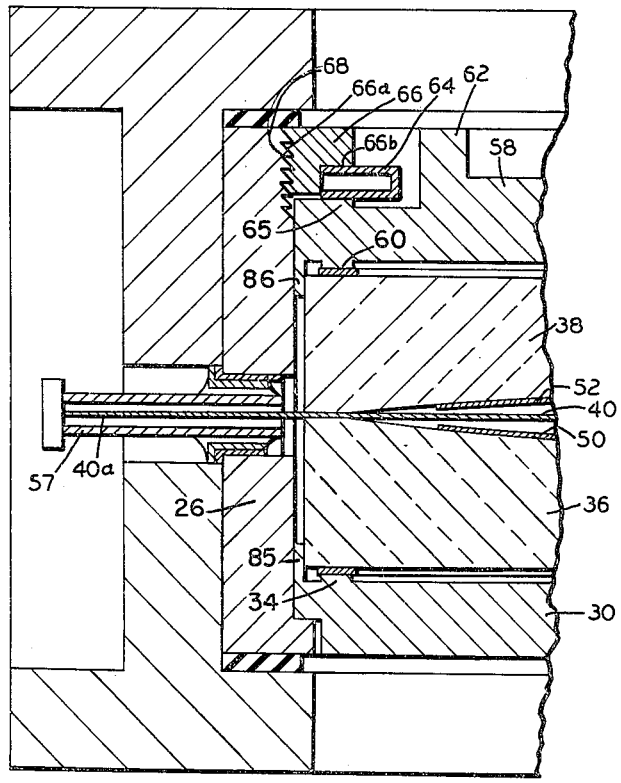

For a fuller understanding of the nature and objects of my invention, reference should be had to the following detailed description taken in connection with the accompanying drawings in which:

FIGURE 1 is a schematic diagram for use in the explanation of the principles involved in my invention, FIGURE 2 is a vertical section taken through the central portion of an improved pressure sensing instrument made in accordance with the principles of my invention, and FIGURE 3 is an enlarged fragmentary section of the end portion of the section of FIGURE 2.

In general, I have found that greatly improved performance in instruments of the type described may be obtained if the diaphragm and its supporting structure are in effect bonded together to form a unitary elastic structure. As used herein and in the claims, the expression "unitary elastic structure" denotes one in which the deformation of the diaphragm part of the structure results in only elastic deformation of the entire structure with no friction, sliding, or relative movement between the diaphragm and its support.

I have also found that a substantial improvement in precision may be obtained if the diaphragm is insulated so that the grounded terminal of the bridge circuit may be the resistor center tap rather than the diaphragm as heretofore described.

In addition, if the diaphragm support and the electrode support are formed from a single homogeneous piece of material, or are so related that they will deform as a single piece of material, errors and loss of precision as a result of variations in electrode-diaphragm spacing will be minimized. Further, where symmetrical electrode-diaphragm supports are located on each side of the diaphragm, many of the errors resulting from temperature variations, etc., will cancel each other; such a construction also provides for almost perfect linearity of the output signal as a function of diaphragm deflection.

Turning to FIGURE 1, I have here shown a simple structure to illustrate the principles involved in my invention. As shown therein, a thin deformable diaphragm 2, under substantial radial tension, is positioned between the flat annular lower surfaces 3 and 4 of circular plates 5 and 6 which may be of dielectric material, e.g., glass or the like. Spherically concave depressions formed in the opposing surfaces of disks 5 and 6 form chambers 7 and 8 which permit diaphragm 2 to move vertically with respect to plates 5 and 6. If diaphragm 2 is to be pressure actuated, passages 9 and 10 are provided from the outer surface of disks 5 and 6 to the chambers 7 and 8. Electrodes 11 and 12 are formed on the concave inner surfaces 13 and 14 of the chambers 7 and 8. As previously described, to sense motion of diaphragm 2, the variation in capacitance of the differential capacitor formed by diaphragm 2 and electrodes 11 and 12 may be measured in conventional fashion by a bridge circuit.

To achieve the high precision resulting from low hysteresis and low zero shift in instruments of this type, I have found that the diaphragm 2 must be bonded to disks 5 and 6 so that diaphragm 2 and disks 5 and 6 form a unitary elastic structure, i.e., diaphragm 2 and disks 5 and 6 will always deflect elastically and together. The bonding between diaphragm 2 and the disks 5 and 6 must be sufficiently strong to prevent any inelastic deformation such as frictional or sliding deformation or relative movement of the diaphragm with respect to the supporting disks.

The word "bond" as used herein includes not only physical bonding but also the securing together by any means of the disks and diaphragm in such manner as to prevent all relative movement or inelastic deformation thereof.

I have found that high force applied to clamp the supporting disk and the diaphragm together is at present the only way to achieve satisfactory bonds and form a unitary elastic structure. Instruments using such high force will hereinafter be referred to as "force-bonded" instruments. No cement or solder presently available of which I am aware has sufficient strength, rigidity and mechanical properties to achieve a truly elastic bond between the two elements. While diaphragms have heretofore been clamped against a flat surface to define the diaphragm location in instruments of this type, these positioning forces were much smaller than those required to achieve a unitary elastic structure. Thus, if the disk 6 is approximately 2 inches in diameter, and the diaphragm is to be subject to pressure differentials of not more than 1 p.s.i., the positioning force required to position the disc against the diaphragm 2 is less than 100 pounds.

It has not been realized heretofore that inelastic deformation took place at the diaphragm supporting structure. However, I have found that it is not sufficient to bond the diaphragm at its outer edge, as has been sometimes done in the past. Rather, it must be bonded to the entire clamping surface of the diaphragm support to prevent inelastic deformation of the diaphragm with respect to the support. To just hold a thin diaphragm under substantial radial tension as heretofore described a force of approximately 500 lbs. is required for a two-inch diameter disk.

There is no simple mathematical relationship which will define the amount of force required to achieve force bonding. This will vary depending upon the diameter of the instrument, and the pressure range over which the instrument is to operate. The required force appears to be almost linearly proportional to disk diameter. Higher pressure ranges require higher forces, although the relationship is not linear. Accordingly, to provide a quantitative definition of the force required for force bonding, the force required in the construction described above will be referred to, although it is to be understood that this force will vary depending upon the particular size and range of the instrument. In general, the required force will be substantially higher than that required to merely maintain the diaphragm radial tension. However, to achieve a unitary elastic structure, a total force of at least ½ ton is necessary to clamp disk and diaphragm together. I have found that while approximately one-half ton in the instrument described achieved excellent zero stability and freedom from hysteresis, the overload characteristics of the instrument are considerably improved if the bonding force is about one ton. An instrument having a ±1 p.s.i. differential pressure range may be overloaded by as much as 20 times when bonded with this latter force, without any noticeable effects.

As shown by arrows 15 and 16 in FIGURE 1, the force applied to bond the diaphragm to the electrode-supporting structure should be applied substantially normal to the surface 4 which locates the plane of diaphragm 2. This prevents warping of the disk 6 and the electrode-supporting structure with resulting inaccuracies in measurement.

Further, to achieve, a unitary elastic structure, the disks 5 and 6 supporting electrodes 11 and 12 should preferably be a single piece of material. However, if disks 5 and 6 are fabricated of several pieces, they must be joined together in such a manner that they behave as a single structure. In this fashion both the diaphragm 2 and the electrode 12 are mounted in a unitary structure which undergoes only elastic deformation, and thus relative displacement of portions of the electrode support and the diaphragm occurs without hysteresis, i.e., for a given diaphragm displacement these portions will always have the same relative location. This further improves the precision of the instrument by eliminating errors introduced in prior instruments by the separation of the electrode and diaphragm supports, such separation resulting in slippage between these members and consequent hysteresis-type error.

To further improve the performance of instruments made according to my invention, the disks 5 and 6 are glass. Thus the diaphragm 2 inserted therebetween is electrically insulated from ground. This means that the resistor junction in the circuit previously described is grounded. Thus all the stray capacitance is in parallel with the resistors which have a relatively low impedance as compared to the capacitive reactance at the excitation frequencies commonly used. The result is that variations in the stray capacitance have a very small effect on bridge balance and errors introduced thereby are minimized.

Instruments made according to my invention have substantially greater precision than prior instruments. Thus, force bonded instruments show a zero stability of the order of $1/1000$ to $1/100$ of 1%. This compares with zero stabilities of between $1/10$ of 1% and 1% in instruments heretofore made. Further, such instruments show no measurable hysteresis when very thin radially tensional materials are used for the diaphragm so that only membrance type deflection of the diaphragm occurs. Force-bonded instruments of this construction show no damage if overloaded, even as much as 1500%. They have high resolution and very high natural frequencies. If thicker materials are used to obtain stiffer diaphragms, the material no longer deflects completely as a membrane and the material itself shows hysteresis. However, no hysteresis is apparent as the result of non-elastic deformation.

Turning now to FIGURE 2, I have here illustrated a particular construction for a differential pressure sensing instrument utilizing force-bonding to hold the diaphragm tightly against the electrode-supporting structure. The motion of the diaphragm is a measure of the differential pressure across it, its deflection being measured as a capacitance variation.

As shown therein the instruments include an outer casing, generally indicated at 18, formed by substantially identical upper and lower cylindrical members 19 and 20. Flanges 21 and 22 are formed at the outer ends of members 19 and 20, and the two members are assembled about the pressure sensitive portion generally indicated at 23 and held together in any convenient fashion as by a plurality of cap screws 24. Outer casing 18 serves as a mounting and support for the pressure sensitive element, the element being supported on flange 21 of cylindrical member 19 and is preferably made of steel, brass, or the like.

The pressure sensitive portion of the instrument includes an inner housing 26 which is cylindrical in shape and has an inwardly extending flange 28 formed at one end. A circular plate 30 having a recess machined about its periphery is supported by flange 28, the recess 32 interfitting with the upper edge of the flange to support and position the plate 30. An upstanding annular projection or land 34 is formed on the upper surface of plate 30 and supports thereon a circular disk 36 of glass or similar dielectric material. A similar disk 38 is supported on disk 36 with a thin metallic diaphragm 40 inserted therebetween. Glass disks 36 and 38 serve to support and position and maintain radial tension in diaphragm 40 and thus perform the same function as disks 5 and 6 in FIGURE 1. The inner opposing surfaces of the disks 36 and 38 have spherically concave depressions 42 and 44 formed therein, and these depressions, together with the diaphragm 40 form two chambers into which the fluids whose differential pressure is to be measured may be admitted through the passages 46 and 48 in disks 36 and 38 respectively.

As better seen in FIGURE 3, both the surfaces of depressions 42 and 44 are covered with thin metallic coatings 50 and 52 which may be conveniently applied by vacuum evaporation or similar processes; these coatings serve as the fixed electrodes of a differential capacitor, the movable member of the capacitor being metal diaphragm 40. Electrodes 50 and 52 are preferably formed of gold for corrosion resistance, although other metals might be used. As shown in FIGURE 3, the electrodes do not touch diaphragm 40 unless a pressure overload causes the diaphragm to "bottom" against them. The interior surfaces of passages 46 and 48 may also be coated in a similar fashion. However, I have found that it is preferable to insert metallic tubes 54 and 56 in the passages to connect electrodes 50 and 52 to the external terminals 78 and 80 to be hereinafter described.

In manufacture, the opposing surfaces of disks 36 and 38 are ground flat by optical methods, and then the concave depressions 42 and 44 are formed therein, leaving an annular flat undepressed surface 36a and 38a on the disks 36 and 38. The depressions are so shaped that their contours are substantially the same as that of the diaphragm 40 when deflected at full range. As a result, in case of a differential pressure overload, the diaphragm "bottoms" against the disk at all points almost simultaneously, preventing further deflection of the diaphragm, which otherwise might cause yielding of the diaphragm and consequent loss of precision. The concave depressions also provide greater sensitivity and linearity as compared to a flat-bottomed depression of comparable depth, since the capacity variations when used in the previously mentioned bridge circuit cause nearly linear change in voltage output as a function of applied differential pressure.

Diaphragm 40 is preferably of stainless steel and of a thickness of about ½ mil. It is located between the disks 36 and 38 while under considerable radial tension. This tension is of the order of 40,000 pounds per square inch. Because of the annular surfaces 36a and 38a, the diaphragm, in its undeflected position, will be flat and, since depressions 42 and 44 are substantially identical, the diaphragm will be equidistant from the electrodes 50 and 52. An untrimmed portion 40a (FIGURE 3) of the diaphragm serves as a lead to connect it to the electrical terminal 57 mounted in, but electrically insulated from, the wall of housing 26.

A circular plate 58, similar to plate 30, rests on the upper surface of disk 38, plate 58 having a land 60, similar to land 34, formed on its inner surface to engage the upper surface of disk 38. The structure by which sufficient force is applied normally to the outer surfaces of the disks 36 and 38 to effectively bond diaphragm 40 therebetween to form a unitary elastic structure is best shown in FIGURE 3. As shown therein, an upstanding annular flange 62 is formed on the upper surface of plate 58. A circular spring 64, which is U-shaped in cross section and is preferably made of beryllium copper or the like, is located adjacent to the outer surface of flange 62. The outer lower edge of spring 64 is supported on a circular land 65 formed on the upper surface of plate 58 and located immediately above the land 60. A ring 66, L-shaped in cross section and having a threaded outer surface 66a, is screwed downwardly into inner housing 26, the threads 66a engaging threads 68 formed in housing 26. As ring 66 is screwed downwardly, the shoulder 66b formed by the arm of the inverted L engages the upper surface of spring 64 and forces it downwardly. This applies a substantial pressure against the land 65 and through it to the land 60. Thus spring 64 is supported by the pressure of shoulder 66b forcing it downwardly against land 65, land 65 in turn transmitting this force to land 60. It will be noted that all of these pressure applying lands are located in a vertical line which is normal to and roughly horizontally centered on the surfaces 36a and 38a to which diaphragm 40 is force bonded. Thus, all pressure applied to hold diaphragm 40 between disks 36 and 38 is applied downwardly from above by land 60 and upwardly from below by land 34. This insures that all pressure is applied normal to the disks 36 and 38, thus preventing distortion of them. The force exerted by the compression of spring 64, and thus the force applied through land 60 which forces disks 36 and 38 together, may be regulated by controlling the degree to which ring 66 is screwed downwardly.

I have found that, with this construction, a total circumferential pressure of more than 1000 pounds may be applied to an instrument having disks 36 and 38 which are approximately 2 inches in diameter. This force is sufficient to achieve a unitary elastic structure when the diaphragm is subjected to differential pressures of not more than ±1 p.s.i., pressures larger than this causing the diaphragm to "bottom" against the electrodes 50 or 52. For larger pressures, where stiffer diaphragms are used, correspondingly higher bonding forces are required. Thus, for a 2 p.s.i. instrument the total bonding force should be of the order of 1 ton, while for a 15 p.s.i. instrument the force should be between 5 and 10 tons.

It should be noted that threads 66a and 68 are preferably of the buttress type having one face of the thread perpendicular to the axis of the screw formed thereby. With conventional threads, there is clearance between the engaging surfaces of the male and female portions, which would allow ring 66 to "cock" or tilt in inner housing 26. This would increase the clamping force on one edge of the disk but decrease it on the other. By using a buttress thread having the load carrying face parallel to the plane of the surfaces 36a and 38a, ring 66 may move laterally from side to side, but cannot cock, thus insuring equal pressure about the entire periphery of the disk 38.

Turning now to FIGURE 2, electrical connection to the electrodes 50 and 52 is made via metal tubes 54 and 56 inserted respectively in passages 46 and 48. The tubes in turn are connected via leads 70 and 72 which extend through passages 74 and 76 to electrical terminals 78 and 80 which are mounted in, but electrically insulated from, the plates 30 and 58. By connecting the terminals 57, 78, and 80 in a bridge circuit, as previously described, extremely minute changes in capacitance and thus of differential pressure may be measured.

Plates 30 and 58 are provided with pressure inlet openings 82 and 84 respectively which lead to the bores 83 and 85 in inlet tubes 54 and 56. The glass disks 36 and 38 are located and positioned within inner housing 26 by the thin sleeves 85 and 86 formed integrally with plates 30 and 58 respectively at the outer edges thereof. Elastomer gasket members 88 and 90 resiliently support the entire pressure sensitive portion 23 within outer housing 18 to prevent damage thereto as a result of shock or vibration.

In the instrument herein described, the diaphragm will return to its initial position to within between $\frac{1}{1000}$ and $\frac{1}{100}$ of 1% of full scale. Indeed, all external effects such as extreme temperature variations, aging, prolonged and high overload, etc., will not increase the zero shift to more than 0.1% of full scale. When it is realized that full scale deflection of the instrument is $\frac{1}{1000}$ of an inch, this means that the diaphragm must return to its initial position after deflection to within about $\frac{1}{10}$ of a microinch. The importance of a unitary elastic structure can readily be understood when it is realized that errors in return position larger than $\frac{1}{10}$ microinch will measurably affect the zero position. Instruments of this sort show hysteresis less than $\frac{1}{1000}$ of 1% when utilizing thin diaphragms under substantial tension and a unitary elastic structure. Extremely high resolution is obtainable, pressure differences of the order of $1 \times 10^{-8}$ p.s.i. producing a discernible output on an instrument having a full scale range of 1 p.s.i. The diaphragm in the instrument I have described has a natural frequency of the order of 3600 c.p.s. Because of force-bonding to form a unitary elastic structure instruments made according to my invention are extremely rugged making them particularly adaptable for use in industrial and military applications.

Thus I have provided an improved construction for instruments utilizing a tensioned diaphragm in their operation. By bonding this diaphragm and its supporting structure together to form a unitary elastic structure, I have found that instruments of much higher precision than those heretofore available may be obtained because of the reduction in both zero shift and hysteresis. The forces required for force-bonding are much higher than those heretofore used, which were sufficient only to locate the diaphragm relative to the electrode. To achieve additional stability the diaphragm supporting structure, which in my instrument also supports an electrode, is preferably of a single homogeneous material or, if of two or more pieces of material, is joined so that it will deform as a part of a unitary elastic structure. Also this diaphragm-electrode supporting structure is of insulating material enabling the diaphragm to be insulated from the case or ground. Thus, the center tap of the low impedance resistors may be grounded, rather than the diaphragm to eliminate the undesirable effects of stray capacitance. When the concepts of my invention are embodied in a symmetrical construction utilizing two substantially identical plates on each side of the diaphragm, the output of the resulting instrument is extremely linear, and errors due to temperature variations, etc., will cancel each other.

I have also described an improved differential pressure sensing device embodying the principles of my invention, this device having, in addition to greater precision as heretofore described, improved resolution and natural frequency, greater resistance to overload and in general a more rugged construction, which permits the use of these high precision instruments in industrial and military applications.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. An instrument having a radially tensioned diaphragm deflectable upon the application of force perpendicular thereto, said instrument comprising, in combination, a diaphragm support made from a single piece of electrically insulating material and having a substantially flat surface, a concave depression formed in said surface, an electrically conducting diaphragm engaging said flat surface, an electrode mounted on the surface of said depression, and means clamping said diaphragm against the flat surface of said diaphragm support with sufficient force to bond said diaphragm to said support to form a unitary elastic structure thereof, whereby said diaphragm and said support deform as a single elastic body upon deflection of said diaphragm, there being essentially no slippage of said diaphragm along said flat surface, said diaphragm having a free span along its diameters between the areas at which it is clamped against said flat surface, and means for making electrical connection to said diaphragm and to said electrode.

2. Apparatus for sensing differential fluid pressure comprising, in combination, a plate having a flat surface, a depression formed in said surface, a fluid impervious diaphragm, means clamping said diaphragm against the surface of said plate having said depression formed therein, said clamping means exerting sufficient force to bond said diaphragm and said plate together to form a unitary elastic structure whereby said plate and said diaphragm deform as a single elastic body upon deflection of said diaphragm, whereby there is essentially no slippage of said diaphragm along said surface, a passage leading from an outer surface of said plate to the chamber formed by said depression and said diaphragm, said diaphragm having a free span across its diameters between the areas at which it is clamped against said surface and means immovable except elastically with respect to said clamping means for determining deflection of said diaphragm with respect to said depression resulting from differences in pressure of fluids admitted by said passage to said chamber and the pressure on the other side of said diaphragm.

3. Apparatus for sensing differential fluid pressure comprising, in combination, a pair of opposed plates, each of the opposing faces of said plates having a depression formed therein, said plates having passages leading from said depressions to their outer surfaces, a diaphragm located between the opposing faces of said plates, clamping means adapted to clamp the outer surfaces of said plates to hold said diaphragm tightly therebetween, said diaphragm and said depressions forming two chambers, said clamping means exerting sufficient force upon the outer surfaces of said plates to bond said diaphragm to said plates and thereby form said plates and said diaphragm into a unitary elastic structure whereby, upon deformation of said diaphragm in response to a difference in pressure on opposite sides thereof, said plates and said diaphragm will deform as a single elastic body, whereby there is essentially no relative movement of the engaging surfaces of said diaphragm and said plates, and means secured to said plates for sensing deflection of said diaphragm with respect to said depression resulting from differences in pressure of fluids admitted by said passages to the chamber formed by said depressions and said diaphragm, said diaphragm having a free span between the areas at which it is clamped against said plates.

4. The apparatus defined in claim 3 in which said diaphragm is under substantial radial tension.

5. The apparatus defined in claim 3 in which the force exerted by said clamping means on said plates is at least ½ ton when said apparatus has a total range for applied differential pressure of ±1 p.s.i. and said plates have a diameter of substantially 2 inches.

6. Apparatus for sensing differential fluid pressure comprising, in combination, a pair of substantially identical opposed plates, each of said plates being formed of a single piece of electrically insulating material, each of the opposing faces of said plates having a concave depression formed therein, the surfaces of said depressions being coated with electrically conducting layers, said plates having passages leading from said depressions to the outer surfaces thereof, an electrically conducting diaphragm located between the opposing faces of said plates under substantial radial tension, clamping means adapted to clamp the outer surfaces of said plates to hold said diaphragm tightly therebetween, said diaphragm having a free span between the clamping surfaces of said plates, said diaphragm and said depressions forming two chambers and the conducting surfaces of said depressions and said diaphragm forming a differential capacitor, said clamping means adapted to exert a force of at least ½ ton substantially normal to the opposed faces of said plates when said apparatus has a total range for applied differential pressure of ±1 p.s.i. and said plates have a radius of substantially 1 inch to bond said diaphragm to said plates and form a unitary elastic structure whereby, upon deflection of said diaphragm, said plates and said diaphragm deflect as a single elastic body, electrical terminals connected to said diaphragm and to the metallized surfaces of said depressions whereby deflection of said diaphragm resulting from differences in pressure of fluid admitted through said passages to said chambers may be electrically measured by the change in capacitance of said differential capacitors.

7. An instrument for measuring the deflection of a diaphragm with respect to an object, said instrument comprising, in combination, a diaphragm elastically yieldable to forces perpendicular thereto tending to cause deflection thereof, means including a supporting structure for said diaphragm and an object structurally fixed with respect to said supporting structure, means bonding said diaphragm to said supporting structure to form a unitary elastic structure, whereby said diaphragm and said supporting structure may deform as a single elastic unit without slippage therebetween in response to said forces, said diaphragm creating substantial forces at the engaging surfaces of said diaphragm and supporting structure upon said deflection of said diaphragm, said diaphragm having a free span between the areas at which it is bonded to said supporting structure, and means for sensing the deflection of said diaphragm with respect to said object.

8. The combination defined in claim 7 in which said object is an integral part of said supporting structure.

9. The combination defined in claim 8 in which said sensing means is an electrically conducting coating on said object.

10. The combination defined in claim 7 in which said diaphragm is a membrane-like metallic member and said supporting structure exerts substantial planar tension on said diaphragm.

11. An instrument for measuring the force applied perpendicularly to a diaphragm, said instrument comprising, in combination, a diaphragm elastically deflectable in response to said perpendicular force, means including a supporting structure for said diaphragm and an object structurally fixed with respect to said supporting structure, said diaphragm creating substantial forces at the engaging surfaces of said diaphragm and said supporting structure in response to deflection of said diaphragm by said perpendicular force, means bonding said diaphragm to said supporting structure to form a unitary elastic structure, whereby, in response to said perpendicular force, said diaphragm and said supporting structure deform as a single elastic unit without slippage therebetween, said diaphragm having a free span between the areas at which it is bonded to said supporting structure, said object being disposed on one side of said diaphragm, and means for sensing the deflection of said diaphragm with respect to said object in response to said perpendicular force.

12. The combination defined in claim 11 including a second object disposed on the other side of said diaphragm and structurally fixed with respect to said supporting structure.

13. The combination defined in claim 12 in which said objects are integral parts of said supporting structure.

14. The combination defined in claim 13 in which said objects are of electrically insulating material and are coated with electrically conducting material, said diaphragm being an electrical conductor, whereby the difference in the capacitances between said diaphragm and said coated objects is a measure of said perpendicular force.

15. Apparatus for sensing differential fluid pressure comprising, in combination, a housing, said housing being adapted to support therein a pressure sensitive element, and having passages formed therein for the admission of fluids whose differential pressure is to be measured by said element, means resiliently supporting said pressure sensitive element in said housing, said pressure sensitive element including a pair of opposed glass plates, each of the opposing faces of said plates having a concave depression formed therein, said depressions being coated with an electrically conducting layer to form an electrode, said plates having passages leading from said depressions to the passages formed in said housing, an electrically conducting diaphragm located between the opposing faces of said plates, said diaphragm and said depressions forming two chambers and the conducting surfaces of said depressions and said diaphragm forming a differential capacitor, clamping means clamping the outer surfaces of said plates to hold said diaphragm tightly therebetween, said clamping means exerting sufficient force on said plates to form said diaphragm and said plates into a unitary elastic structure whereby upon deflection of said diaphragm said plates and said diaphragm deflect as a single elastic body and there is essentially no slippage of said diaphragm along the portions of said opposing faces in contact therewith, said diaphragm having a free span along its diameters between said outer surfaces of said plates, electrical connections attached to said diaphragm and to the metallized surfaces of the depressions formed in said plates, electrical terminals mounted in said housing, leads interconnecting said diaphragm and said electrodes of said pressure sensitive element to said electrical terminals whereby deflection of said diaphragm resulting from differences in pressure of fluids admitted through the passages in said housing to said chambers may be electrically measured by the change in capacitance of said differential capacitors.

References Cited in the file of this patent

UNITED STATES PATENTS

| | | |
|---|---|---|
| 1,001,810 | Brown | Aug. 29, 1911 |
| 2,564,527 | Fortier | Aug. 14, 1951 |
| 2,667,786 | Spaulding | Feb. 2, 1954 |
| 2,751,530 | Armstrong | June 19, 1956 |
| 2,800,796 | Westcott | July 30, 1957 |